United States Patent
Delgado et al.

(10) Patent No.: US 10,208,141 B2
(45) Date of Patent: Feb. 19, 2019

(54) THERMORESPONSIVE POLYMERS

(71) Applicant: PHILLIPS 66 COMPANY, Houston, TX (US)

(72) Inventors: Paula Delgado, Bartlesville, OK (US); Amit Palkar, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 15/662,847

(22) Filed: Jul. 28, 2017

(65) Prior Publication Data

US 2018/0030170 A1    Feb. 1, 2018

Related U.S. Application Data

(60) Provisional application No. 62/368,454, filed on Jul. 29, 2016.

(51) Int. Cl.
| C08F 220/56 | (2006.01) |
| C08F 220/34 | (2006.01) |
| C08F 20/56  | (2006.01) |
| C08L 53/00  | (2006.01) |
| C08F 2/06   | (2006.01) |
| C08F 8/30   | (2006.01) |

(52) U.S. Cl.
CPC .............. *C08F 20/56* (2013.01); *C08F 2/06* (2013.01); *C08F 8/30* (2013.01); *C08L 53/00* (2013.01)

(58) Field of Classification Search
CPC . C08F 220/56; C08F 220/34; C08F 2220/343
See application file for complete search history.

(56) References Cited

PUBLICATIONS

Jiaxi Cui and Aránzazu del Campo, Chem. Commun., 2012, 48, 9302-9304.*
Jan Seuring and Seema Agarwal, Macromolecules 2012, 45, 3910-3918.*

* cited by examiner

*Primary Examiner* — Vu A Nguyen
(74) *Attorney, Agent, or Firm* — Phillips 66 Company

(57) ABSTRACT

A polymer comprising

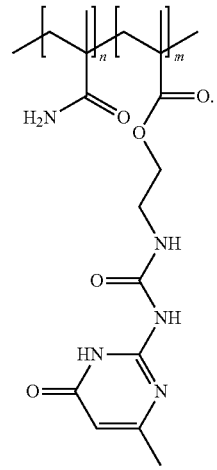

4 Claims, 5 Drawing Sheets

THERMORESPONSIVE POLYMERS

CROSS-REFERENCE TO RELATED APPLICATIONS

This application is a non-provisional application which claims the benefit of and priority to U.S. Provisional Application Ser. No. 62/368,454 filed Jul. 29, 2016, entitled "Thermoresponsive Polymers," which is hereby incorporated by reference in its entirety.

STATEMENT REGARDING FEDERALLY SPONSORED RESEARCH OR DEVELOPMENT

None.

FIELD OF THE INVENTION

This invention relates to thermoresponsive polymers.

BACKGROUND OF THE INVENTION

Thermoresponsive polymers are polymers that exhibit a drastic and discontinuous change of the physical properties with temperature.

There exists a need for thermoresponsive polymers that can be formed through temperature changes.

BRIEF SUMMARY OF THE DISCLOSURE

A polymer comprising

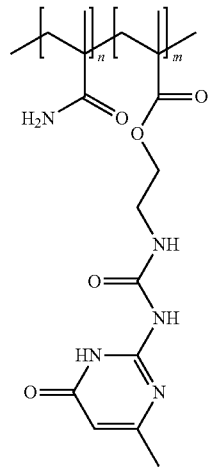

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

A polymer comprising

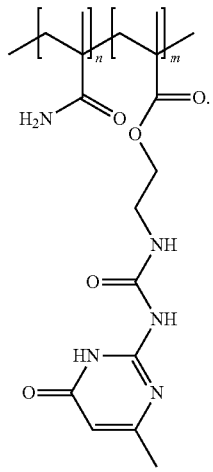

It is theorized that such a polymer would be a thermoresponsive polymer. It is also theorized that such a thermoresponsive polymer can be water soluble at high temperatures.

In one embodiment, the repeat units of the n polymer can be from n=1 to n=100,000,000. In another embodiment, the repeat units of the m polymer can be from m=1 to m=100,000,000.

The polymer can be made using any known method to make the polymer. One such method involves by mixing

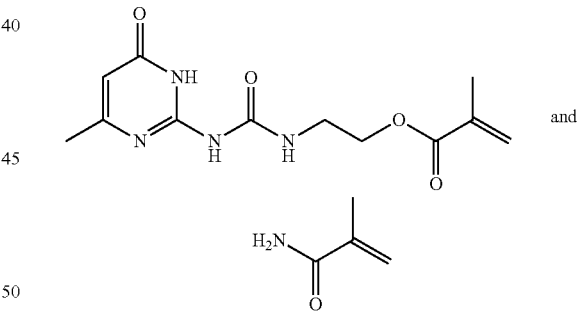

and in the presence of a solvent to form a monomer solution. An initiator is then added to the monomer solution to form the thermoresponsive polymer.

In another embodiment, the polymer can be made by mixing

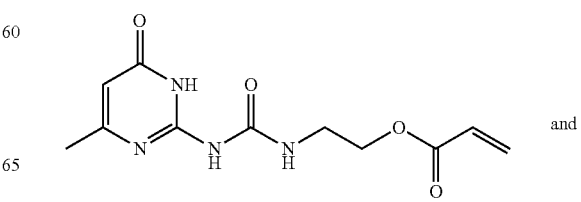

and

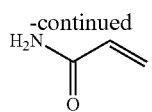

in the presence of an aqueous solution to form a monomer solution.

In another embodiment the method can involve mixing

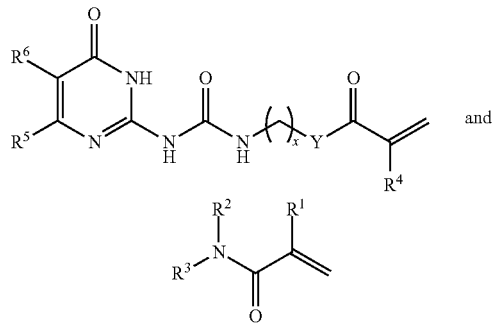

in the presence of a solvent to form a monomer solution. An initiator is then added to the monomer solution to form the polymer. In this method, R1 and R4 can be independently selected from the group consisting of H and alkyl groups; R2 and R3 can be independently selected from the group consisting of H, alkyl, olefinic, aromatic, heterocyclic, halogen, ammonium, nitroxides, nitrates, nitrite amides, amines, esters, ethers, carboxylic acids, acyl chlorides, alcohols, nitriles, phosphates, phosphonates, sulfates, sulfonates, sulfide, sulfite, thiol, and combinations thereof; Y can be selected from the group consisting of O, N and S; R5 and R6 can be independently selected from the group consisting of alkyl, olefinic, heterocyclic, halogens, ammonium, carboxylic, amines, esters, amides and combinations thereof; and X are methylene groups.

Upon completion of polymerization, the polymer exhibits thermoresponsive behavior through hydrogen bonding in water. When bonded together the hydrogen bonding groups can be either bonded to water, with complementary hydrogen bonding groups or could be self-complementary bonded.

In one embodiment, the average molecular weight of the polymer is greater than 50,000. In other embodiments, the average molecular weight is greater than 60,000, 62,000, 65,000, 70,000, 71,000, 75,000 even greater than 80,000.

In one embodiment the solvent can be an organic solvent. Non-limiting examples of solvents that can be used include dimethyl sulfoxide, dimethyl formamide, ethyl acetate, methanol, dioxane, tetrahydrofuran, acetone, methylene chloride, chloroform, and toluene.

Figure 1:
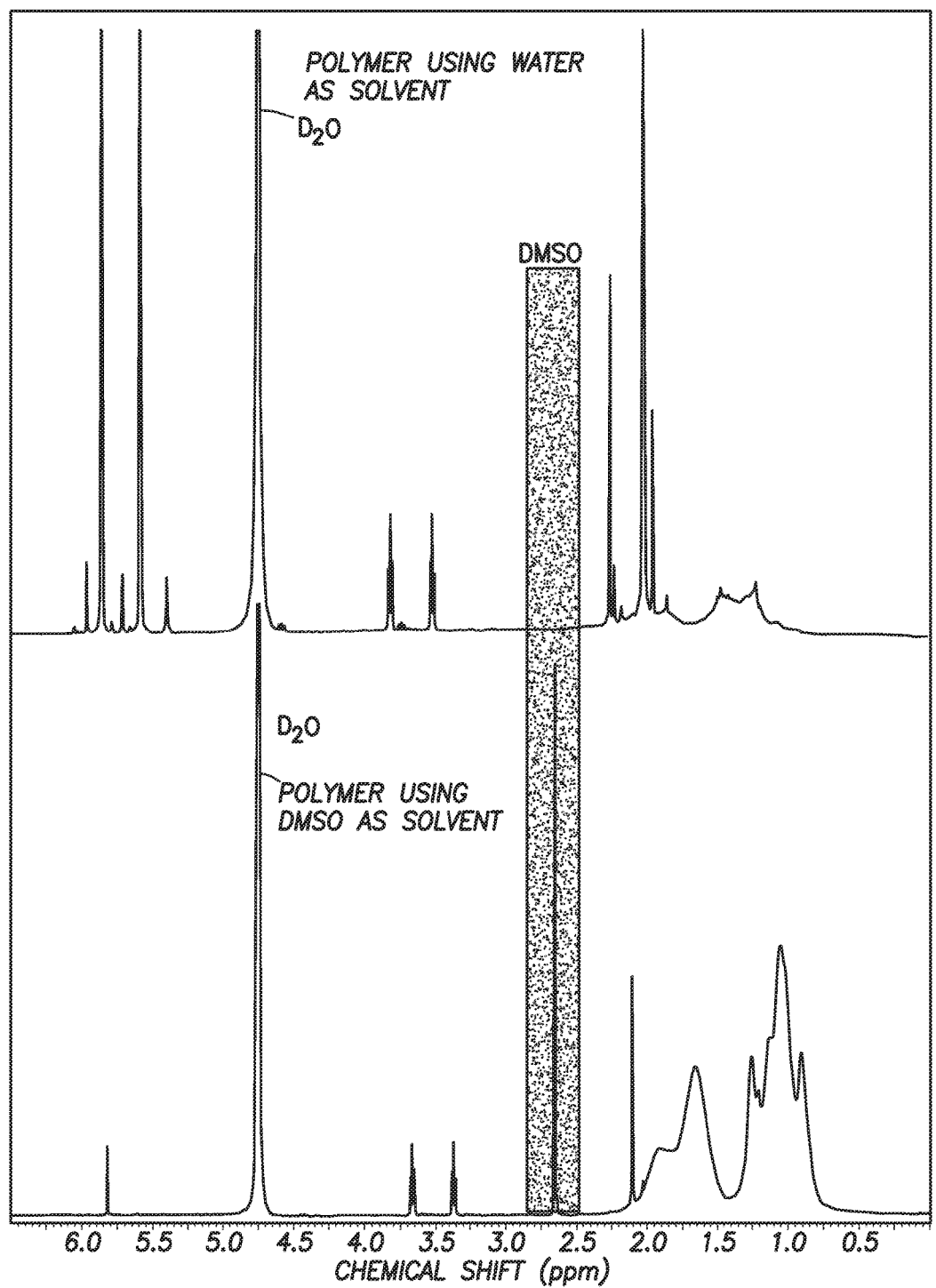
FIG. 1 depicts a NMR comparison of a thermoresponsive polymer made with an organic solvent versus one made with water.

In other embodiments, the solvent can be water with inorganic salts, such as electrolyte solutions. Any conventionally known inorganic salts can be used. FIG. 1 depicts a NMR comparison of using an organic solvent as a solvent versus using water. As shown in the Figure, the organic solvent of dimethyl sulfoxide can be difficult to remove from the polymer and can result in a polymer with an organic solvent contaminant. When the solvent is water it is envisioned that the purification step can be optional.

In another embodiment the initiator can be an addition-type initiator, such as radical initiators. Non-limiting examples of addition-type initiators that can be used include azo initiators, azobisisobutyronitriles, peroxides, persulfates and redox systems. In one embodiment the initiator can also be a UV initiator. Non-limiting examples of peroxide initiators include: persulfate salts, hydrogen peroxide, alkyl peroxide, alkyl peroxyesters, peroxydicarbonates, hydroperoxides and combinations thereof. Non-limiting examples of azo initiators include: 4,4'-azobis(4-cyanovaleric acid), 4,4'-azobis-(4-cyanopentanoic acid), 2,2'-azobis(2-methylpropionamidine)dihydrochloride, 2,2'-azobis[2-(2-imidazolin-2-yl)propane]dihydrochloride, 2,2'-azobis[N-(2-carboxyethyl)-2-methylpropionamidine] tetrahydrate, 2,2'-azobis[2-(2-imidazolin-2-yl)propane], 2,2'-azobis[2-methyl-N-(2-hydroxyethyl)propionamide], 2,2'-azobis-(2-amidinopropane) dihydrochloride, 2,2'-azobis(N,N'-dimethylene isobutyramidine) dihydrochloride, 2,2'-azobis (N,N'-dimethylene isobutyramidine), 2,2'-azobis-(isobutyramide)dehydrate, 2,2'-azobis-(N-ethylamidinopropane hydrochloride), 2,2'-azobis-(N,N'-dimethyleneamidinopropane hydrochloride), 2,2'-azobis(2-propane-2-carboxylic acid), 2,2'-azobis-(2-methyl-N-(2-hydroxyethyl))propionamide, 2,2'-azobis-[2-methyl-N-(1,1-bis(hydroxymethyl)]propionamide, 2,2'-azobis-[2-methyl-N-(1,1-bis(hydroxymethyl)-2-hydroxyethyl)]propionamide and combinations thereof.

The reaction time to create the polymers can range from less than ten minutes, less than 15 minutes, less than half an hour, less than an hour, less than 2 hours, less than 4 hours, or even less than 24 hours. The reaction time is theorized to be dependent upon the starting materials.

In one embodiment azobisisobutyronitrile can be dissolved in the same or different solvent in molar ratios of 1:5 to 1:10000 with respect to the molar concentration of the monomer solution to form the thermoresponsive polymer. Examples of ranges in molar ratios from 1:5, 1:10, 1:25, 1:50 1:75, 1:100, 1:500, 1:1000, 1:1500, 1:2000, 1:2500, 1:3000, 1:3500, 1:4000, 1:4500, 1:5000, 1:5500, 1:6000, 1:6500, 1:7000, 1:7500, 1:8000, 1:8500, 1:9000, 1:9500, 1:10000 or any range in between the numbers given.

In one embodiment the monomer solution is heated to a temperature greater than 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or even greater than 200° C. The heating of the monomer solution can occur either by directly heating the monomer solution, incorporating the monomer solution into another solution with a greater temperature than the monomer solution, or any other method known of heating the monomer solution.

In another embodiment the mixing of the monomer solution occurs at an elevated temperature. Examples of the temperature in which the monomer solution can be mixed in include temperature greater than 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or even greater than 200° C. The mixing of the monomer solution at an elevated temperature can occur by heating one component of the monomer solution, heating multiple components of the monomer solution or any other known method of mixing the monomer solution at an elevated temperature. This monomer solution can then be optionally degassed at room temperature or the temperatures above. The reaction time can be any time necessary for conversion of monomers,

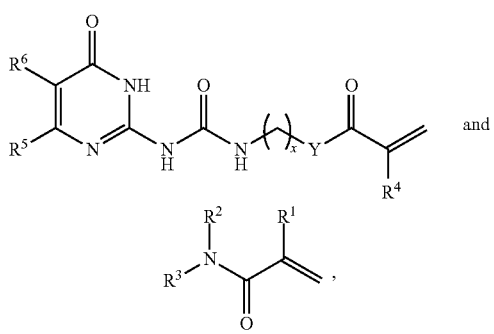

within the monomer solution to polymers. Additionally, the reaction time can be any time necessary for the reaction of monomers,

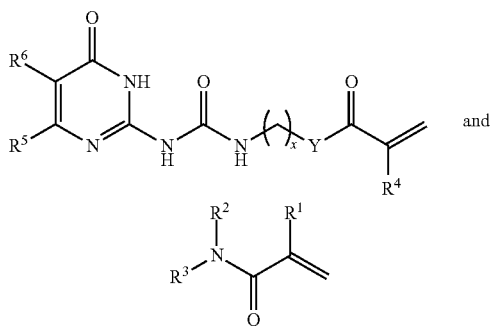

to take place.

In one embodiment the thermoresponsive polymer is purified in a polar solvent, such as alcohol. Examples of type of polar solvents that can be used include ethanol, methanol, acetone, water, tetrahydrofuran, ether and ethyl acetate.

In one embodiment the ratio of 2-(3-(4-methyl-6-oxo-1, 6-dihydropyrimidin-2-yl)ureido)ethyl methacrylate (MAUPy) to methacrylamide (MAAm) in monomer solution ranges in mol percentage from 0.01:99.99, 0.05:99.5, 1:99, 2:98, 3:97, 4:96, 5:95, 6:94, 7:93, 8:92, 9:91, 10:90, 11:89, 12:88, 13:87, 14:86, 15:85, 16:84, 17:83, 18:82, 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:56, 45:55, 46:54, 47:53, 48:52, 49:51, 50:50 or any range in between the numbers given.

There are a variety of methods in which the thermoresponsive polymer can be incorporated into the wastewater. In one method it is possible that the thermoresponsive polymer is directly added into the wastewater. In another method, the thermoresponsive polymer is dissolved in a chemical solution, which solubilizes the polymer, and then incorporated in the wastewater. In one example the chemical is Sodium Chloride (NaCl) solution. The amount of chemical added can be from about 0.0001 wt % to about 30 wt %, or from any amount greater than about 0.0005 wt %, 0.001 wt %, 0.005 wt %, 0.01 wt %, 0.05 wt %, 0.1 wt %, 0.5 wt %, 1 wt %, to any amount smaller than about 25 wt %, 20 wt %, 15 wt %, 10 wt %, or even about 5 wt %.

Examples of wastewater can be from refineries such as desalter effluent, produced water from oil and gas production sites, from paper making facilities, from municipal water treatment facilities or any other facility that produces wastewater. Wastewater can be broadly defined as any aqueous environment that has high inorganic salts content (broadly defined as greater than or equal to 100 ppm, greater than or equal to 200 ppm or around or around 1000 ppm), suspended solids ($\leq$500 ppm), hydrocarbons (as free and/or emulsified oil), other organics and inorganics or combinations thereof.

The following examples of certain embodiments of the invention are given. Each example is provided by way of explanation of the invention, one of many embodiments of the invention, and the following examples should not be read to limit, or define, the scope of the invention.

Example 1

The amounts of 2-(3-(4-methyl-6-oxo-1,6-dihydropyrimidin-2-yl)ureido)ethyl methacrylate (MAUPy) and methacrylamide (MAAm) listed in Table 1, along with 1.2 mL of dimethyl sulfoxide solvent, were added to a 50 mL Schlenk flask equipped with a stir bar. The chemicals started to dissolve after immersing the flask in a 70° C. oil bath under strong stirring. When the solution was homogenous, the system was degassed by freeze-pump thaw or by bubbling an inert gas. After degassing, the solution was again immersed into the 70° C. oil bath to preserve the monomers in solution. In a separate small vial, the corresponding amount of azobisisobutyronitrile (AIBN) was dissolved in 100 μL of dimethyl sulfoxide solvent (DMSO), and subsequently degassed. The polymerization started after the addition of the azobisisobutyronitrile solution to the reaction flask at 70° C. under an inert atmosphere. These conditions were maintained for 4 h. The polymerization was then quenched by exposing the reaction mixture to air at room temperature or by adding a radical inhibitor. Polymers were purified by 24 h of stirring in methanol (100 mL) followed by 24 h of dialysis in methanol (3000 g $mol^{-1}$ cut off).

TABLE 1

| Sample | MAAm ratio | MAUPy amount | MAAm amount | AIBN amount |
|---|---|---|---|---|
| Poly(MAUPy)-100 | 0 | 100 mg, 3.6 × 10−1 mmol | | 0.117 mg, 7.1 × 10−4 mmol |
| Poly(MAUPy-MAAm)-70 | 30 | 100 mg, 3.6 × 10−1 mmol | 13.01 mg, 0.15 mmol | 0.17 mg, 1.0 × 10−3 mmol |
| Poly(MAUPy-MAAm)-50 | 50 | 100 mg, 3.6 × 10−1 mmol | 30.37 mg, 0.36 mmol | 0.23 mg, 1.4 × 10−3 mmol |
| Poly(MAUPy-MAAm)-20 | 80 | 100 mg, 3.6 × 10−1 mmol | 121.48 mg, 1.43 mmol | 0.59 mg, 3.6 × 10−3 mmol |
| Poly(MAUPy-MAAm)-10 | 90 | 100 mg, 3.6 × 10−1 mmol | 273.32 mg, 3.24 mmol | 1.17 mg, 7.1 × 10−3 mmol |

TABLE 1-continued

| Sample | MAAm ratio | MAUPy amount | MAAm amount | AIBN amount |
|---|---|---|---|---|
| Poly(MAUPy-MAAm)-5 | 95 | 100 mg, 3.6 × 10−1 mmol | 577.01 mg, 6.78 mmol | 2.34 mg, 1.4 × 10−2 mmol |
| Poly(MAUPy-MAAm)-2 | 98 | 100 mg, 3.6 × 10−1 mmol | 1.49 g, 17.49 mmol | 5.86 mg, 3.6 × 10−2 mmol |

Table 2 depicts the solubility of different samples of Poly(MAUPy-MAAm)

TABLE 2

| Sample | MA ratio | Solubility in water 175° F. | Solubility in water at 175° F. with 1 wt % NaCl |
|---|---|---|---|
| Poly(MAUPy-MAAm)-70 | 30 | No | Yes |
| Poly(MAUPy-MAAm)-50 | 50 | No | Yes |
| Poly(MAUPy-MAAm)-20 | 80 | No | Yes |
| Poly(MAUPy-MAAm)-10 | 90 | No | Yes |
| Poly(MAUPy-MAAm)-5 | 95 | Yes | Yes |
| Poly(MAUPy-MAAm)-2 | 98 | Yes | Yes |

Example 2

Figure 2:
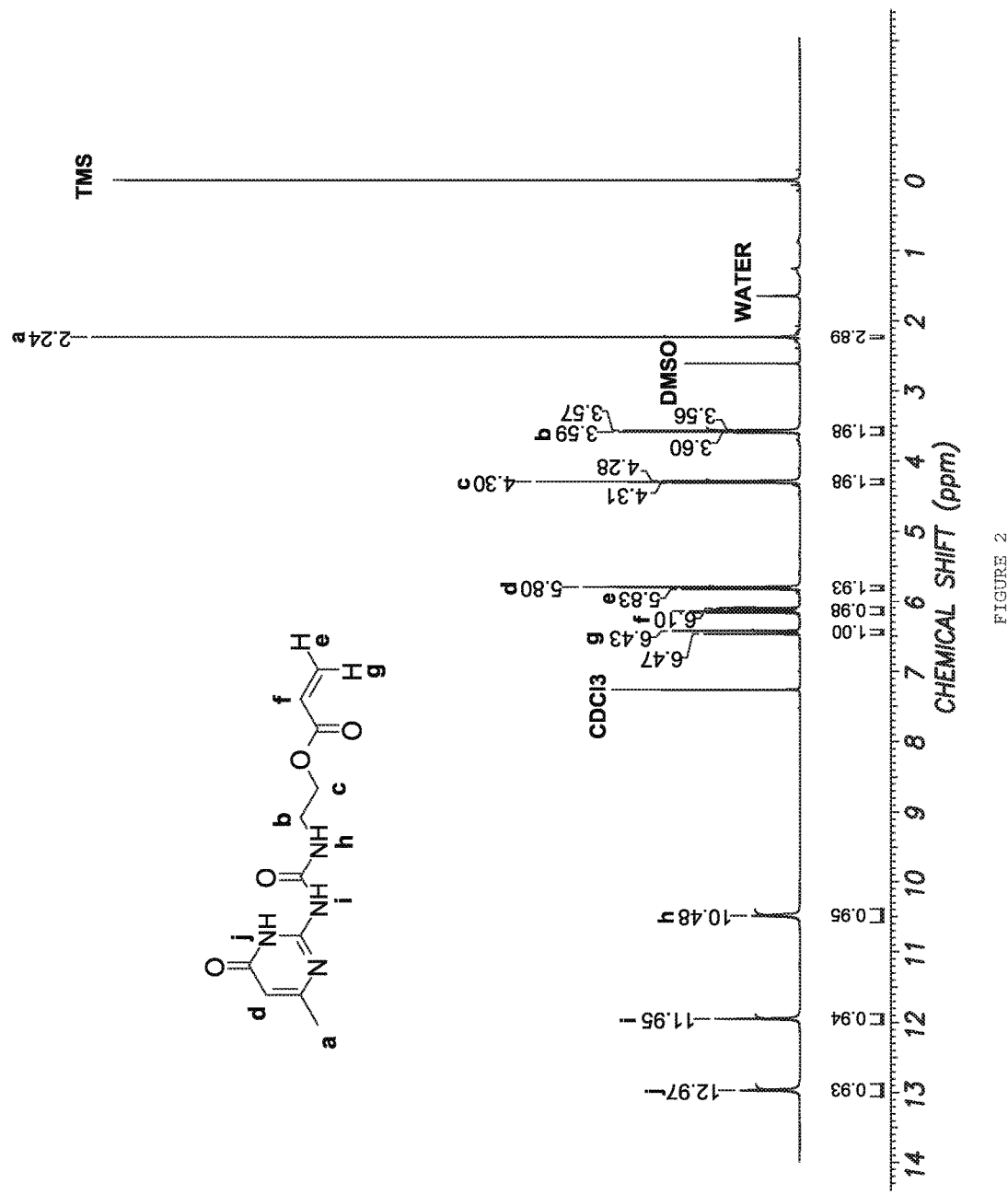
FIG. 2 depicts a $^1$H NMR of 2-(3-(4-methyl-6-oxo-1,6-dihydropyrimidin-2-yl)ureido)ethyl acrylate.
Figure 3:
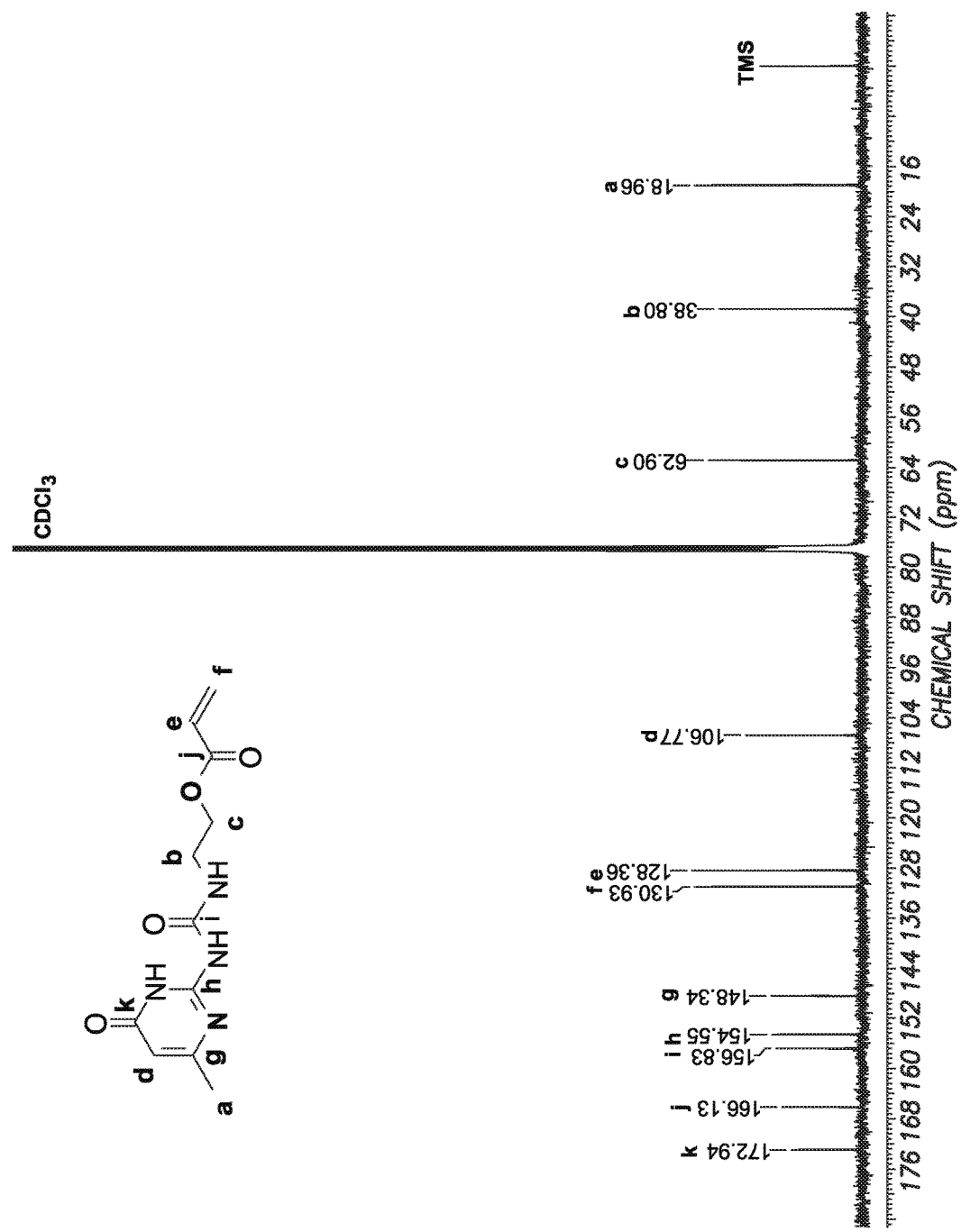
FIG. 3 depicts a $^{13}$C NMR of 2-(3-(4-methyl-6-oxo-1,6-dihydropyrimidin-2-yl)ureido)ethyl acrylate.
Figure 4:
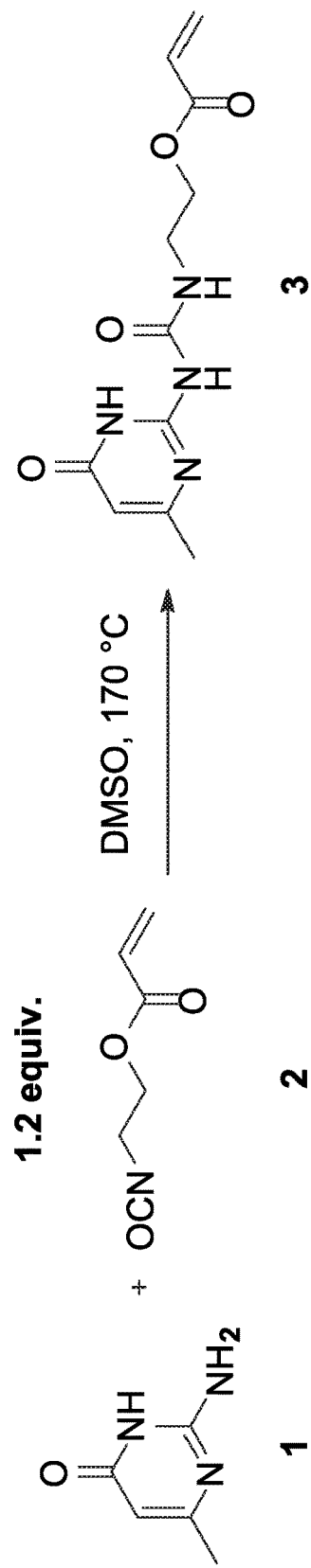
FIG. 4 depicts a reaction scheme.

Synthesis of 2-(3-(4-methyl-6-oxo-1,6-dihydropyrimidin-2-yl)ureido)ethyl acrylate (AUPy): To a round bottom flask equipped with a magnetic stir bar 6-methyl isocytosine (4.0 g, 32 mmol) and 50 mL dimethyl sulfoxide solvent were added. In order to dissolve the 6-methyl isocytosine in the DMSO, the flask was sealed with a septum and heated to 170° C. using an oil bath. Upon dissolution, the oil bath was removed and 2-isocyanatoethyl acrylate (4.8 mL, 38 mmol) was added via syringe. The reaction was then quenched by cooling the reaction flask in a 2-propanol/$CO_{2(s)}$ bath. After 5-10 min of cooling the reaction flask was thawed using an ambient temperature water bath and the white solid was washed 3×1000 mL with cold water (stirring for ≥60 min per wash), filtered, and dried at reduced pressure overnight to yield 7.57 g of white powder (89% yield). FIG. 2 depicts the $^1$H NMR of the AUPy and FIG. 3 depicts the $^{13}$C NMR of the AUPy. FIG. 4 depicts the reaction scheme for this reaction.

Figure 5:
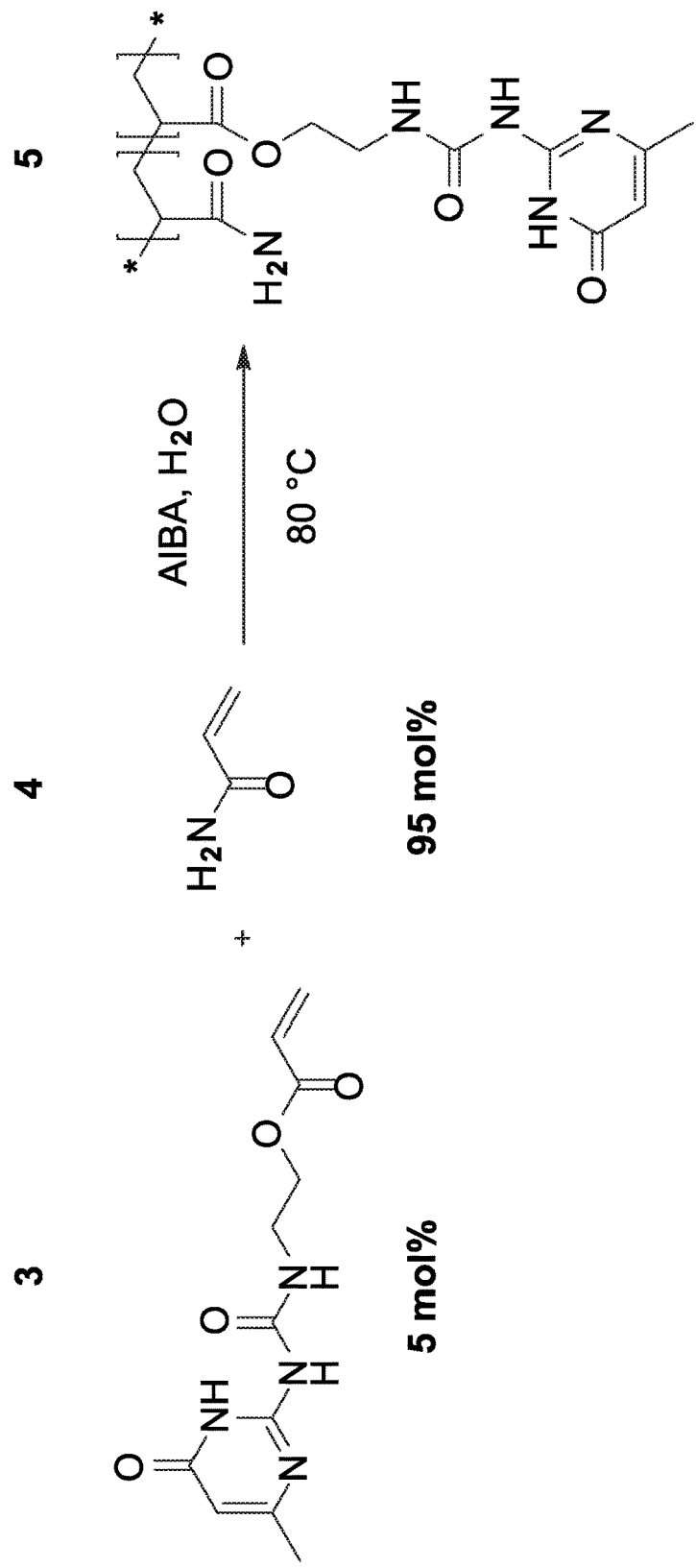
FIG. 5 depicts a reaction scheme.

Synthesis of Poly[acrylamide-co-2-(3-(4-methyl-6-oxo-1,6-dihydropyrimidin-2-yl)ureido)ethyl acrylate], p(AUPy-AAm)-5: To a 25 mL round bottom flask equipped with a magnetic stirrer, 0.20 g AUPy, 1.02 g acrylamide (AAm), 0.05 g sodium carbonate, and 12 mL water was added. The flask was immersed in an 80° C. oil bath to dissolve the solids and the mixture was degassed by argon flow for 30 minutes. In a 2 mL vial, 0.0065 g 2,2'-Azobis(2-methylpropionamidene) dihydrochloride (AIBA) was added to 0.2 mL water. The AIBA solution was degassed by argon flow and transferred to the round bottom flask using a 1 mL syringe to initiate the polymerization. This method generates p(AUPy-AAm)-5, a copolymer that consists of 95 mol % AAm and 5 mol % AUPy and with a monomer to initiator ratio of 600 to 1. FIG. 5 depicts the reaction scheme for this reaction.

The reaction mixture was purified by stirred at 500 rpm for 4 hours, and an opaque and viscous solution was obtained. The polymer was precipitated from solution as white solids by slowly adding equal volume of acetone to reaction mixture. The polymer-acetone-water slurry was separated by centrifugation (5000 rpm, 5 min), the liquid was decanted, and the resulting solid material was dried at reduced pressure to yield 1.19 g of white powder (97% yield).

Example 3

Random copolymer of 5 mol % of 2-(3-(4-methyl-6-oxo-1,6-dihydropyrimidin-2-yl)ureido)ethyl methacrylate and 95 mol % of methacrylamide were synthesized in water and inorganic salts and purified with perchlorate (sample DI-Perchlorate), synthesized in water and inorganic salts and purified with hydrochloric acid (sample DI-HCl), and synthesized in DMSO and washed in water (sample DMSO-DI). The apparent viscosity, specific viscosity and weight average molecular weight are shown in Table 3.

TABLE 3

| Polymer | Apparent Viscosity mPa-s | Specific Viscosity (a.u.) | Mw (g/mol)$^2$ |
|---|---|---|---|
| DI-Perchlorate | 1.051 ± 0.016 | 0.289 | 62,200 ± 6,000 |
| DI-HCl | 1.060 ± 0.014 | 0.300 | 65,600 ± 5,000 |
| DMSO-DI | 1.074 ± 0.002 | 0.317 | 71,000 ± 1,000 |

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:
1. A polymer comprising:

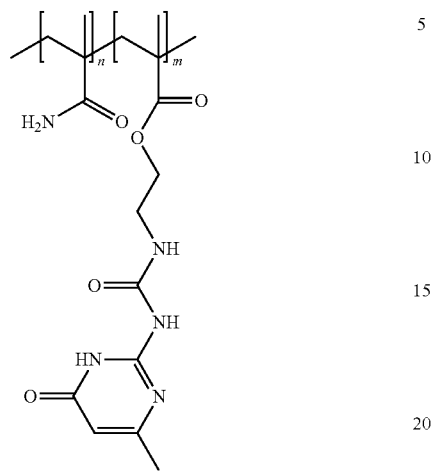

wherein the polymer has a weight average molecular weight greater than 50,000 and the mol % of methacrylamide is greater than 95.

2. The polymer of claim 1, wherein the polymer has an upper critical solubility temperature.

3. The polymer of claim 1, wherein the polymer is water soluble.

4. The polymer of claim 1, wherein n can be from about n=1 to about n=100,000,000 and from about m=1 to about m=100,000,000.

* * * * *